United States Patent
Mikami et al.

(10) Patent No.: US 7,684,757 B2
(45) Date of Patent: Mar. 23, 2010

(54) WIRELESS DEVICE AND WIRELESS NETWORK SYSTEM

(75) Inventors: Taro Mikami, Osaka (JP); Suguru Ogawa, Osaka (JP); Akifumi Nagao, Osaka (JP); Masataka Irie, Osaka (JP)

(73) Assignee: Panasonic Corporation, Osaka (JP)

( * ) Notice: Subject to any disclaimer, the term of this patent is extended or adjusted under 35 U.S.C. 154(b) by 592 days.

(21) Appl. No.: 11/305,150

(22) Filed: Dec. 19, 2005

(65) Prior Publication Data

US 2006/0141956 A1  Jun. 29, 2006

(30) Foreign Application Priority Data

Dec. 28, 2004  (JP) ............... 2004-381062

(51) Int. Cl.
  *H04B 17/00* (2006.01)
  *H04B 7/00* (2006.01)
  *H04B 15/00* (2006.01)
(52) U.S. Cl. ............. 455/62; 455/509; 455/67.13
(58) Field of Classification Search ............. 455/450, 455/501, 509, 515, 63.1, 67.11, 67.13, 62
See application file for complete search history.

(56) References Cited

U.S. PATENT DOCUMENTS

| 6,847,805 | B2* | 1/2005 | Liu ............... 455/69 |
| 6,993,294 | B2* | 1/2006 | Nobukiyo et al. ......... 455/67.11 |
| 7,050,759 | B2* | 5/2006 | Gaal et al. ............ 455/67.13 |
| 7,209,712 | B2* | 4/2007 | Holtzman .............. 455/67.13 |
| 7,239,659 | B2* | 7/2007 | Thomas et al. ............ 375/141 |
| 7,386,277 | B2* | 6/2008 | Cho et al. .................... 455/69 |
| 2002/0060995 | A1 | 5/2002 | Cervello et al. |
| 2003/0083017 | A1* | 5/2003 | Fukui .................. 455/67.3 |
| 2005/0037718 | A1* | 2/2005 | Kim et al. ................ 455/101 |
| 2005/0181799 | A1* | 8/2005 | Laroia et al. ............. 455/450 |
| 2005/0227697 | A1* | 10/2005 | Borst et al. ............... 455/450 |
| 2007/0287487 | A1* | 12/2007 | Puig-Oses et al. .......... 455/501 |

* cited by examiner

*Primary Examiner*—Nay A Maung
*Assistant Examiner*—Andrew Wendell
(74) *Attorney, Agent, or Firm*—McDermott Will & Emery LLP

(57) ABSTRACT

When the communication channel is to be changed, a more optimal communication channel is determined by summing up the results of measuring communication states transmitted from individual wireless terminals A, B, and C and making a collective judgment. Weighting coefficients are set to the individual wireless terminals A, B, and C. Values indicating whether or not the respective communication states of the individual wireless terminals are optimal with channels ch1 to ch4 to be used for communication (which are, e.g., 1, 0, 1, 2 with the respective channels ch1, ch2, ch3, and ch4 for the wireless terminal A and larger as the communication states are less optimal) are multiplied by the weight coefficient (the value of 3). The resulting values are summed up on a per-channel basis and the most optimal communication channel (of which the summed value is lowest) is selected. As a result, wave interference with the other wireless terminal is reduced.

13 Claims, 15 Drawing Sheets

|  | WIRELESS TERMINAL A | WIRELESS TERMINAL B | WIRELESS TERMINAL C | SUM |
|---|---|---|---|---|
| ch1 | 2 | 2 | 0 | 4 |
| ch2 | 0 | 0 | 5 | 5 |
| ch3 | 0 | 0 | 8 | 8 |
| ch4 | 0 | 0 | 10 | 10 |

FIG. 5A

|  | WIRELESS TERMINAL A | WIRELESS TERMINAL B | WIRELESS TERMINAL C |
|---|---|---|---|
| WEIGHT COEFFICIENT | 3 | 1 | 1 |

FIG. 5B

|  | WIRELESS TERMINAL A | WIRELESS TERMINAL B | WIRELESS TERMINAL C | SUM |
|---|---|---|---|---|
| ch1 | 1(x3) | 1(x1) | 0(x1) | 4 |
| ch2 | 0(x3) | 2(x1) | 1(x1) | 3 |
| ch3 | 1(x3) | 2(x1) | 2(x1) | 7 |
| ch4 | 2(x3) | 2(x1) | 2(x1) | 10 |

FIG. 6A

|  | WIRELESS TERMINAL A | WIRELESS TERMINAL B | WIRELESS TERMINAL C |
|---|---|---|---|
| BANDWIDTH GUARANTEE | ABSENT | PRESENT | ABSENT |
| WEIGHT COEFFICIENT | 1 | 4 | 1 |

FIG. 6B

|  | WIRELESS TERMINAL A | WIRELESS TERMINAL B | WIRELESS TERMINAL C | SUM |
|---|---|---|---|---|
| ch1 | 1(x1) | 1(x4) | 0(x1) | 5 |
| ch2 | 0(x1) | 3(x4) | 2(x1) | 14 |
| ch3 | 1(x1) | 2(x4) | 2(x1) | 11 |
| ch4 | 2(x1) | 0(x4) | 2(x1) | 4 |

FIG. 7A

|  | WIRELESS TERMINAL A | WIRELESS TERMINAL B | WIRELESS TERMINAL C |
|---|---|---|---|
| AMOUNT OF DATA TRANSMISSION/RECEPTION | 0pack/s | 500pack/s | 0pack/s |
| WEIGHT COEFFICIENT | 0 | 2 | 0 |

FIG. 7B

|  | WIRELESS TERMINAL A | WIRELESS TERMINAL B | WIRELESS TERMINAL C | SUM |
|---|---|---|---|---|
| ch1 | 1(x0) | 1(x2) | 0(x0) | 2 |
| ch2 | 0(x0) | 1(x2) | 2(x0) | 2 |
| ch3 | 1(x0) | 0(x2) | 2(x0) | 0 |
| ch4 | 2(x0) | 2(x2) | 2(x0) | 4 |

FIG. 9A

|  | WIRELESS TERMINAL A | WIRELESS TERMINAL B | WIRELESS TERMINAL C |
|---|---|---|---|
| PER | 0% | 0% | 3% |
| WEIGHT COEFFICIENT | 1 | 1 | 2 |

FIG. 9B

|  | WIRELESS TERMINAL A | WIRELESS TERMINAL B | WIRELESS TERMINAL C | SUM |
|---|---|---|---|---|
| ch1 | 1(x1) | 1(x1) | 0(x2) | 2 |
| ch2 | 0(x1) | 1(x1) | 2(x2) | 5 |
| ch3 | 1(x1) | 2(x1) | 2(x2) | 7 |
| ch4 | 2(x1) | 2(x1) | 2(x2) | 8 |

FIG. 11A

|  | WIRELESS TERMINAL A | WIRELESS TERMINAL B | WIRELESS TERMINAL C |
|---|---|---|---|
| TERMINAL TYPE | WIRELESS CHANNEL CONTROL TERMINAL | WIRELESS TERMINAL | WIRELESS TERMINAL |
| WEIGHT COEFFICIENT | 5 | 1 | 1 |

FIG. 11B

|  | WIRELESS TERMINAL A | WIRELESS TERMINAL B | WIRELESS TERMINAL C | SUM |
|---|---|---|---|---|
| ch1 | 1(x5) | 1(x1) | 0(x1) | 6 |
| ch2 | 0(x5) | 1(x1) | 2(x1) | 3 |
| ch3 | 1(x5) | 2(x1) | 2(x1) | 9 |
| ch4 | 2(x5) | 2(x1) | 2(x1) | 14 |

FIG. 12A

|  | WIRELESS TERMINAL A | WIRELESS TERMINAL B | WIRELESS TERMINAL C |
|---|---|---|---|
| USER SPECIFICATION | 2 | 1 | 0 |
| WEIGHT COEFFICIENT | 2 | 1 | 0 |

FIG. 12B

|  | WIRELESS TERMINAL A | WIRELESS TERMINAL B | WIRELESS TERMINAL C | SUM |
|---|---|---|---|---|
| ch1 | 1(x2) | 1(x1) | 0(x0) | 3 |
| ch2 | 0(x2) | 1(x1) | 2(x0) | 1 |
| ch3 | 1(x2) | 2(x1) | 2(x0) | 4 |
| ch4 | 2(x2) | 2(x1) | 2(x0) | 6 |

FIG. 13A

|  | WIRELESS TERMINAL A | WIRELESS TERMINAL B | WIRELESS TERMINAL C |
|---|---|---|---|
| INTENSITY OF WAVE RECEPTION | — | −5dbm | −20dbm |
| WEIGHT COEFFICIENT | — | 1 | 3 |

FIG. 13B

|  | WIRELESS TERMINAL A | WIRELESS TERMINAL B | WIRELESS TERMINAL C | SUM |
|---|---|---|---|---|
| ch1 | — | 1(x1) | 0(x3) | 3 |
| ch2 | — | 1(x1) | 2(x3) | 7 |
| ch3 | — | 2(x1) | 2(x3) | 10 |
| ch4 | — | 2(x1) | 2(x3) | 12 |

FIG. 14

|  | FIRST-TIME MEASUREMENT | SECOND-TIME MEASUREMENT | THIRD-TIME MEASUREMENT | FOURTH-TIME MEASUREMENT | FIFTH-TIME MEASUREMENT |  |
|---|---|---|---|---|---|---|
| ch1 | 0 | 0 | 0 | 2 | 3 |  |
| ch2 | 0 | 0 | 0 | 0 | 0 |  |
| ch3 | 1 | 2 | 3 | 3 | 4 |  |
| ch4 | 2 | 1 | 1 | 1 | 2 |  |
| CHANGE IN MEASUREMENT RESULT | — | PRESENT | ABSENT | PRESENT | ABSENT | 2/5 (RATE) |

FIG. 15A

|  | WIRELESS TERMINAL A | WIRELESS TERMINAL B | WIRELESS TERMINAL C |
|---|---|---|---|
| RELIABILITY | 2/5 | 0/5 | 0/5 |
| WEIGHT COEFFICIENT | 1 | 2 | 2 |

FIG. 15B

|  | WIRELESS TERMINAL A | WIRELESS TERMINAL B | WIRELESS TERMINAL C | SUM |
|---|---|---|---|---|
| ch1 | 1(x1) | 1(x2) | 0(x2) | 3 |
| ch2 | 0(x1) | 1(x2) | 2(x2) | 6 |
| ch3 | 1(x1) | 2(x2) | 2(x2) | 9 |
| ch4 | 2(x1) | 2(x2) | 2(x2) | 10 |

FIG. 16A

|  | WIRELESS TERMINAL A | WIRELESS TERMINAL B | WIRELESS TERMINAL C |
|---|---|---|---|
| BANDWIDTH GUARANTEE | PRESENT | PRESENT | ABSENT |
| AMOUNT OF DATA TRANSMISSION/RECEPTION | 0pack/s | 500pack/s | 0pack/s |
| WEIGHT COEFFICIENT | 1 | 6 | 0 |

FIG. 16B

|  | WIRELESS TERMINAL A | WIRELESS TERMINAL B | WIRELESS TERMINAL C | SUM |
|---|---|---|---|---|
| ch1 | 1(x1) | 1(x6) | 0(x0) | 7 |
| ch2 | 0(x1) | 1(x6) | 2(x0) | 6 |
| ch3 | 1(x1) | 2(x6) | 2(x0) | 13 |
| ch4 | 2(x1) | 2(x6) | 2(x0) | 14 |

|  | WIRELESS TERMINAL A | WIRELESS TERMINAL B | WIRELESS TERMINAL C | SUM |
|---|---|---|---|---|
| ch1 | 2 | 2 | 2 | 6 |
| ch2 | 0 | 0 | 0 | 0 |
| ch3 | 0 | 0 | 0 | 0 |
| ch4 | 0 | 0 | 0 | 0 |

|  | WIRELESS TERMINAL A |
|---|---|
| ch1 | 2 |
| ch2 | 0 |
| ch3 | 0 |
| ch4 | 0 |

|  | WIRELESS TERMINAL B |
|---|---|
| ch1 | 2 |
| ch2 | 0 |
| ch3 | 0 |
| ch4 | 0 |

|  | WIRELESS TERMINAL C |
|---|---|
| ch1 | 0 |
| ch2 | 5 |
| ch3 | 8 |
| ch4 | 10 |

WIRELESS DEVICE AND WIRELESS NETWORK SYSTEM

CROSS REFERENCE TO RELATED APPLICATION

This Non-provisional application claims priority under 35 U.S.C. § 119(a) on Patent Application No. 2004-381062 filed in Japan on Dec. 28, 2004, the entire contents of which are hereby incorporated by reference.

BACKGROUND OF THE INVENTION

The present invention relates to wireless terminals and a wireless communication system in wireless communication which selects a communication channel.

With the widespread use of wireless communication devices, the problem of electric wave interference between the devices has been appearing. As means for circumventing the wave interference, it is possible to measure the states of use of usable wireless channels and use the wireless channels which do not interface with each other.

As disclosed in U.S. Pat. Application Publication No. US 2002/0060995 A1, a conventional method for selecting a communication channel in wireless communication measures the states of use of wireless channels at each of a base station and one or more wireless terminals. The wireless terminal notifies the base station of the results of measurement, while the base station is define as means for analyzing the measurement results and indicating the communication channel to be used for communication to the wireless terminal.

However, the prior art technology mentioned above has not described a specific method for analyzing the measurement results at the base station. When the method of analysis used at the base station is merely a method for determining the communication channel by immediately analyzing the measurement results upon each receipt of the measurement results from any wireless communication terminal, the determined communication channel may possibly be a channel with conditions preferred only by the wireless terminal that has first transmitted the measurement result notification. For example, there is the possibility that, with the communication channel newly selected by the base station, the wireless terminal which has performed important data communication may be affected by wave interference and the data communication may be inhibited thereby.

As a specific example, a wireless network structure composed of three wireless terminals is shown in FIG. 1. The wireless terminal A is assumed to specify one of a plurality of wireless channels usable for communication between itself and each of the other wireless terminals B and C as the communication channel to be used for actual communication and perform data communication.

Each of the wireless terminal A and the other wireless terminals B and C has the function of measuring the respective states of use of the plurality of usable communication channels. Each of the wireless terminals B and C transmits the measurement results as a measurement result notification 104 to the wireless terminal A. The wireless terminal A is assumed to have the function of individually analyzing the contents of the measurement results received from the wireless terminals B and C and issuing, when there is a channel in a state more optimal than that of the current communication channel, a channel change instruction 105 for changing the communication channel to each of the wireless terminals B and C.

FIG. 2 is a table showing the results of channel measurement transmitted from the wireless terminals B and C to the wireless terminal A. The table of FIG. 2 shows evaluation values obtained as the results of measuring the channels ch1 to ch4 at each of the wireless terminals A, B, and C. In the table of FIG. 2, larger values represent lower evaluation levels. For example, when the wireless terminal A is first notified of the measurement results from the wireless terminal C and the channel ch4 is currently used as the communication channel, the channel ch4 has the value of 10 as the measurement result indicating the least optimal communication state in the table. Accordingly, the wireless terminal A selects the channel ch1 with the value of 0 as the most optimal channel and issues the channel change instruction to each of the other wireless terminals B and C in the wireless network such that the communication channel is changed from the channel ch4 to the channel ch1. At this time, if it is assumed that the wireless terminals A and B are currently performing important data communication therebetween and the wireless terminal C is performing no data communication, the problem occurs that the changing of the communication channel from the channel ch4 to the channel ch1 based on the measurement results from the wireless terminal C causes trouble in the data communication between the wireless terminals A and B that has been optimal thus far. In the table of FIG. 2, each of the results of measuring the channel ch1 at the wireless terminals A and B has the value of 2 so that, from the comparison with the value of 0 of the channel ch4 before the channel change, the communication state has deteriorated. Thus, the changing of the communication channel based only on the results of individual measurement at any of the wireless terminals may occasionally cause trouble in the communication of another wireless terminal.

SUMMARY OF THE INVENTION

It is therefore an object of the present invention to change the communication channel based on the measurement results without degrading the state of the other part of currently proceeding communication.

To attain the object, in a wireless network wherein a base station or a wireless channel control terminal which performs communication with at least one wireless terminal specifies one of two or more wireless channels to perform communication, the present invention sums up the results of measuring the states of use of the two or more wireless channels at the plurality of wireless terminals belonging to the same wireless network, i.e., the measurement results each indicating whether or not the communication state is optimal, makes a collective judgment, and selects the communication channel in the most optimal communication state for the entire wireless network.

Specifically, the wireless terminal according to the present invention is a wireless terminal using, as a communication channel for communication, either or any of two or more wireless channels to be used in a wireless network formed between the wireless terminal and at least one other wireless terminal, the wireless terminal comprising: a channel measuring unit having a function of measuring a state of use indicating whether or not a communication state of each of the two or more wireless channels is optimal and outputting a result of the measurement; a receiving unit for receiving the state of use of the wireless channel measured by the other wireless terminal with which the communication currently proceeds from the other wireless terminal; a communication channel determining unit for determining a new communication channel in an optimal communication state to be newly used for the communication in place of the currently used communication channel based on a result of summing up the states of use obtained as the measurement results outputted from the channel measuring unit of the wireless terminal to which it belongs and the measurement results outputted from the channel measuring unit of the other wireless terminal and outputting a channel change instruction for changing the currently used communication channel to the new communication channel; a channel changing unit for changing the currently used communication channel to the new communication channel in response to the channel change instruction outputted from the communication channel determining unit that has determined the new communication channel; and a transmitting unit for transmitting the channel change instruction outputted from the communication channel determining unit to the other wireless terminal.

In the wireless terminal in an aspect of the present invention, the communication channel determining unit sets a specified weight to each of individual values obtained as the measurement results from each of the wireless terminal to which it belongs and the other wireless terminal on a per wireless-terminal basis and sums up the states of use to each of which the specified weight has been set.

In the wireless terminal in the aspect of the present invention, the communication channel determining unit sets the specified weight to each of the measured states of use based on the presence or absence of a bandwidth guarantee given to each of the wireless terminals having and not having the communication channel determining unit and sums up the states of use to each of which the specified weight has been set.

In the wireless terminal in the aspect of the present invention, the communication channel determining unit sets the specified weight to each of the measured states of use based on an amount of data transmission/reception of each of the wireless terminals having and not having the communication channel determining unit and sums up the states of use to each of which the specified weight has been set.

In the wireless terminal in the aspect of the present invention, the communication channel determining unit sets the specified weight to each of the measured states of use based on an error rate in an amount of data transmission/reception of each of the wireless terminals having and not having the communication channel determining unit and sums up the states of use to each which the specified weight has been set.

In the wireless terminal in the aspect of the present invention, the communication channel determining unit sets the specified weight to each of the measured states of use such that the weight of the wireless terminal having the communication channel determining unit is larger than the weight of the wireless terminal not having the communication channel determining unit and sums up the states of use to each of which the specified weight has been set.

In the wireless terminal in the aspect of the present invention, the communication channel determining unit allows a user to arbitrarily set the specified weight to each of the measured states of use and sums up the states of use to which the specified weight has been set.

In the wireless terminal in the aspect of the present invention, the communication channel determining unit sets the specified weight to each of the measured states of use based on a wave reception intensity of each of the measurement results transmitted from the other wireless terminal and sums up the states of use to each of which the specified weight has been set.

In the wireless terminal in the aspect of the present invention, the communication channel determining unit sets the specified weight to each of the measured states of use based on a reliability of each of the measurement results previously obtained and sums up the states of use to each of which the specified weight has been set.

In the wireless terminal in the aspect of the present invention, the communication channel determining unit determines the new communication channel by simultaneously using at least two of the specified weights described above.

In the wireless terminal in the aspect of the present invention, when the communication channel determining unit has intercepted the channel change instruction transmitted from the other communication channel determining unit of the other wireless terminal in a wireless network other than the wireless network to which it belongs, the communication channel determining unit does not perform a channel change to a channel indicated by the intercepted channel change instruction.

In the wireless terminal in the aspect of the present invention, the communication channel determining unit primarily selects a plurality of the communication channels in accordance with a specified standard based on each of the received measurement results and then selects the new communication channel from the primarily selected communication channels by using pseudo-random numbers.

In the wireless terminal in the aspect of the present invention, the communication channel determining unit selectively determines whether or not the channel change to the new communication channel is to be performed based on pseudo-random numbers.

A wireless communication system according to the present invention comprises: one wireless terminal comprising the communication channel determining unit described above; and at least one other wireless terminal not comprising the communication channel determining unit.

Thus, the present invention sums up the results of measuring the states of use of the wireless channels obtained from the individual wireless terminals in the wireless network and collectively determines the communication channel in the most optimal communication state for the entire wireless network based on the result of the summing up. This allows the selection of the communication channel without entailing the degradation of the state of the other part of communication caused by focusing attention on only one part of the communication.

In particular, the present invention sets the specified weight to each of the results of measuring the states of use of the wireless channels obtained from the wireless terminals in the wireless network, sums up the results of measurement to each of which the specified weight has been set, and performs the channel change to the communication channel in the optimal communication state based on the obtained result of the summing up. This allows the communication channel to be determined by giving a higher priority to the wireless terminal currently performing an important part of communication for which the level of the communication state should be held higher than for the other part of the communication and thereby allows the selection of a more optimal communication channel.

BRIEF DESCRIPTION OF THE DRAWINGS

FIG. 5A is a view showing a weighting table for wireless terminals in a second embodiment of the present invention and FIG. 5B is a view showing an example of summing up the measurement results according to weighting in the second embodiment;

FIG. 6A is a view showing a weighting table based on the presence or absence of a bandwidth guarantee in a third embodiment of the present invention and FIG. 6B is a view showing an example of summing up the measurement results according to weighting in the third embodiment;

FIG. 7A is a view showing a weighting table based on an amount of data transmission/reception in a fourth embodiment of the present invention and FIG. 7B is a view showing an example of summing up the measurement results according to weighting in the fourth embodiment;

FIG. 9A is a view showing a weighting table based on a packet error rate in a fifth embodiment of the present invention and FIG. 9B is a view showing an example of summing up the measurement results according to weighting in the fifth embodiment;

FIG. 11A is a view showing a weighting table based on whether or not each of the wireless terminals is the wireless channel control terminal in a sixth embodiment of the present invention and FIG. 11B is a view showing an example of summing up the measurement results according to weighting in the sixth embodiment;

FIG. 12A is a view showing a weighting table based on user specification in a seventh embodiment of the present invention and FIG. 12B is a view showing an example of summing up the measurement results according to weighting in the seventh embodiment;

FIG. 13A is a view showing a weighting table based on the reception intensity of a measurement result notification frame in an eighth embodiment of the present invention and FIG. 13B is a view showing an example of summing up the measurement results according to weighting in the eighth embodiment;

FIG. 14 is a view showing an example of calculating the reliabilities of the measurement results in a ninth embodiment of the present invention;

FIG. 15A is a view showing a weighting table based on the reliabilities of the measurement results in the ninth embodiment and FIG. 15B is a view showing an example of summing up the measurement results according to weighting in the ninth embodiment;

FIG. 16A is a view showing a weighting table based on a plurality of factors in a tenth embodiment of the present invention and FIG. 16B is a view showing an example of summing up the measurement results according to weighting in the tenth embodiment;

DETAILED DESCRIPTION OF THE INVENTION

The preferred embodiments of the present invention will be described herein below with reference to the accompanying drawings.

EMBODIMENT 1

A description will be given first to a first embodiment of the present invention.

Figures 1, 2:
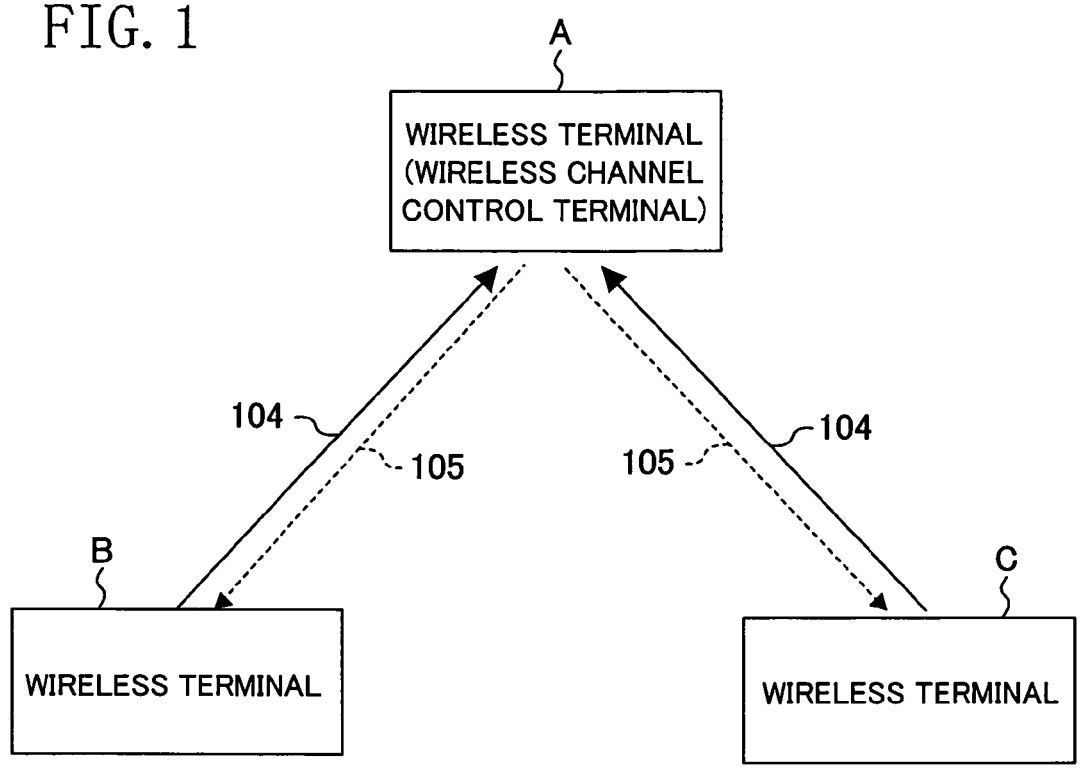
FIG. 1 is a structural view of a conventional wireless network.
FIG. 2 is a view showing the results of summing up measurement results at a wireless channel control terminal in a first embodiment of the present invention.

FIG. 1 shows a wireless network structure composed of one wireless channel control terminal A and two wireless terminals B and C. Each of the two wireless terminals B and C measures the states of use of usable wireless channels each indicating whether or not the communication state is optimal and notifies the wireless channel control terminal A of the results of measurement as a measurement result notification 104.

Of the wireless terminals (wireless channel control terminals) A, B, and C, the wireless terminal A is different from the other wireless terminals B and C in that it analyzes the results of measuring the states of use of the communication channels at the wireless terminals A, B, and C and determines a more optimal communication channel to which the current communication channel can be changed based on the result of analysis.

The wireless terminal A functions as the wireless channel control terminal which issues a channel change instruction to each of the other wireless terminals B and C such that the current communication channel is changed to a more optimal communication channel determined based on the result of analysis. The wireless channel control terminal may also be a base station.

Figure 4:
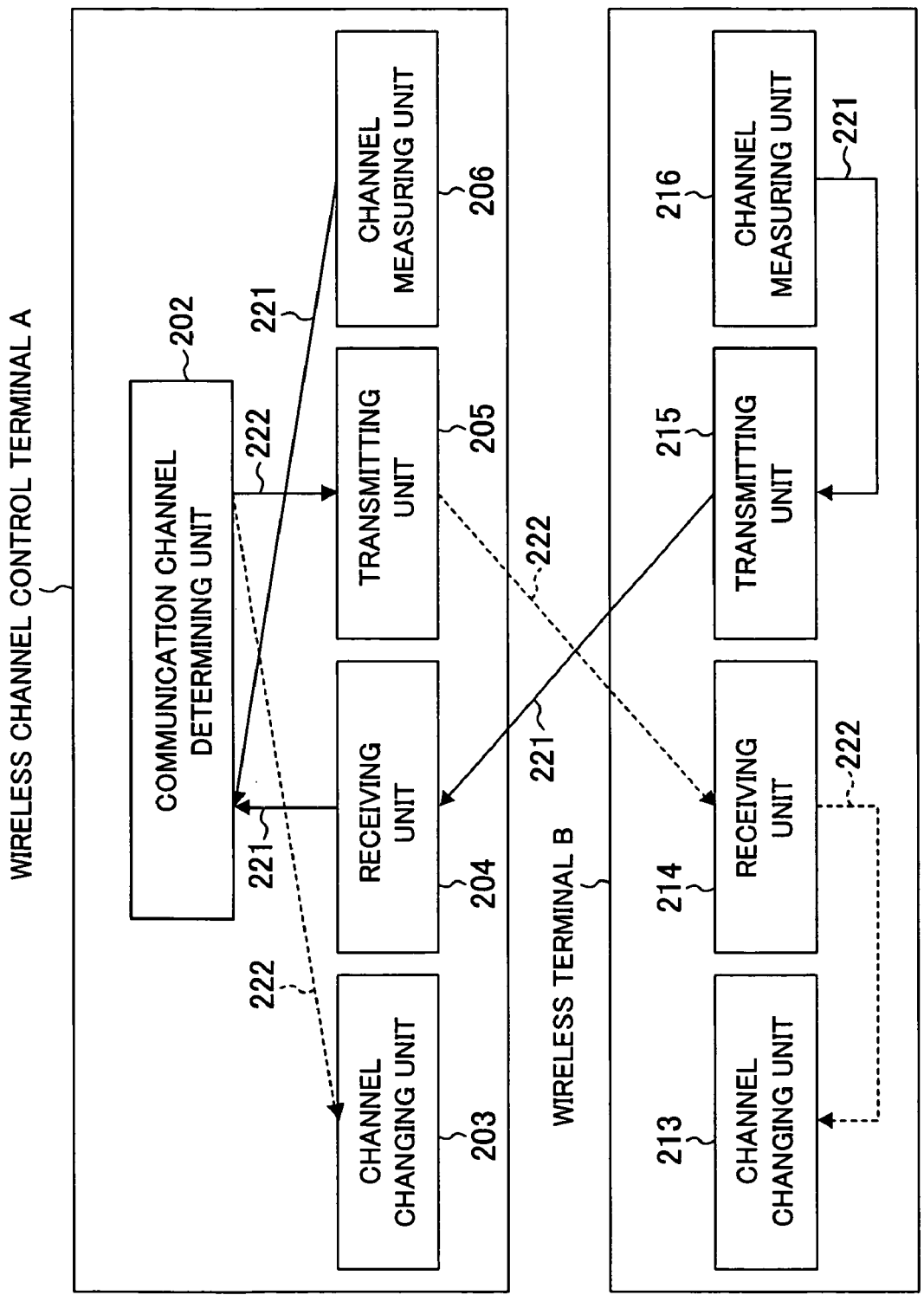
FIG. 4 is an internal structure view of each of the wireless channel control terminal and a wireless terminal in the first embodiment.

FIG. 4 shows the internal structures of the wireless terminals A and B of FIG. 1. In FIG. 4, the wireless terminal A of FIG. 1 is shown as the wireless channel control terminal A. The wireless terminal C is the same as the wireless terminal B, though it is not depicted in the drawing.

The wireless channel control terminal A and the wireless terminal B have respective channel measuring units 206 and 216 each having the function of measuring the states of use of the usable wireless channels.

The channel measuring unit 206 in the wireless channel control terminal A is assumed to have the function of notifying a communication channel determining unit 202 provided in the wireless channel control terminal A of the measurement results.

The communication channel determining unit 202 determines the communication channel used in the wireless network based on a measurement result notification 221 received from each of the channel measuring units 206 and 216. The measurement result notification 221 outputted from the channel measuring unit 216 of the wireless terminal (other wireless terminal) B is inputted to the communication channel determining unit 202 via the communication between the transmitting unit 215 of the wireless terminal B and the receiving unit 204 of the wireless channel control terminal A. The communication channel determining unit 202 has the function of instructing each of channel changing units 203 and 213 to change the channel, while each of the channel changing units 203 and 213 has the function of changing the wireless channel based on a channel change instruction 222 from the communication channel determining unit 202. The channel change instruction 222 is transmitted to the channel changing unit 213 of the wireless terminal B via the communication between the transmitting unit 205 of the wireless channel control terminal A and the receiving unit 214 of the wireless terminal B.

In the present and subsequent embodiments, the internal structures of the wireless terminals will be described based on the structures shown in FIG. 4 of the present embodiment.

A description will be given to conventional channel measurement and a conventional channel change with reference to FIGS. 21 and 22.

Figures 21, 22:
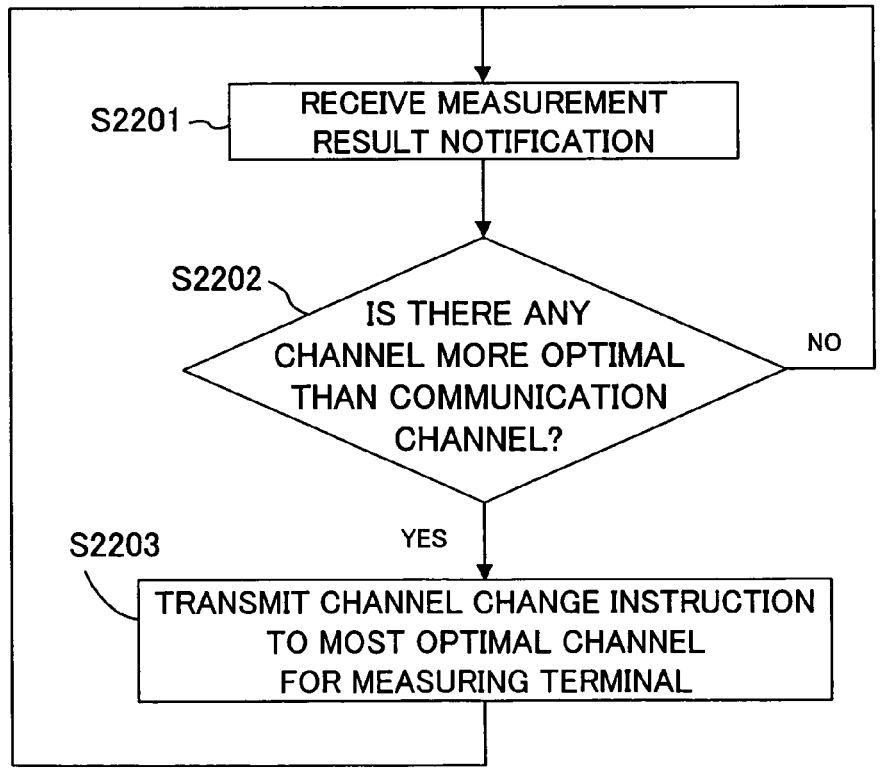
FIG. 21 is a view showing individual measurement results at a conventional wireless channel control terminal.
FIG. 22 is a flow chart for processing in a conventional communication channel determining unit.

FIG. 21 shows the results of channel measurement performed individually by the channel measuring unit at each of the wireless terminals A to C. The wireless channels to be measured are four channels ch1 to ch4. In the table, the larger values represent the less optimal communication states. This allows the communication channel determining unit 202 of the wireless terminal A to recognize the states of use of the communication channels at each of the wireless terminals. As a result of measurement, when there is a channel in a more optimal state of use than that of the current communication channel, the communication channel determining unit 202 can issue the channel change instruction 222 to each of the channel changing unit 203 of the wireless terminal to which it belongs and the channel changing units 213 of the wireless terminals B and C and thereby change the communication channel.

FIG. 22 shows the flow of a channel determining/changing process in the communication channel determining unit 202. The communication states at the individual wireless terminals are as shown in FIG. 21. It is assumed that the channel ch1 is the initially selected communication channel. After the initiation of the process, first in Step S2201, the communication channel determining unit 202 receives the measurement result notification 221 from the channel measuring unit 206 of the wireless terminal A to which it belongs. Then, in Step S2202, the communication channel determining unit 202 judges whether or not there is a more optimal communication channel to which the current communication channel can be changed based on the received measurement results. Since there are the more optimal communication channels ch2 to ch4, the communication channel determining unit 202 of the wireless terminal A determines the channel ch2 as a new communication channel (although the results of measuring the channels ch2, ch3, and ch4 are the same, the channel with the smallest number is assumed to be selected). The whole process flow then moves to Step S2203 where the communication channel determining unit 202 transmits the channel change instruction 222 to each of the channel changing unit 203 the wireless terminal to which it belongs and the channel changing units 213 of the other wireless terminals B and C. Through the sequence of process steps S2201 to S2203, the channel change to the more optimal communication channel is completed. Next, the whole process flow returns to Step S2201 where the communication channel determining unit 202 receives the measurement result notification 221 from the channel measuring unit 216 of the wireless terminal B. Since there is no communication channel more optimal than the channel ch2 in Step S2202, the whole process flow returns to Step S2201. The communication channel determining unit 202 further receives the measurement result 221 from the channel measuring unit 216 of the wireless terminal C. Since the most optimal communication channel for the wireless terminal C is the channel ch1, the communication channel determining unit 202 issues the instruction 222 to change the communication channel to the channel ch1 to each of the channel changing unit 203 of the wireless terminal to which it belongs and the channel changing units 213 of the other wireless terminals B and C. Thus, every time a more optimal communication channel for each of the terminals is found, a channel change has been performed normally. In accordance with the method described above, however, a useless channel change occurs and the communication channel after the channel change, which is partially optimal for any of the wireless terminals A to C, is not necessarily optimal for the other wireless terminals.

Figure 3:
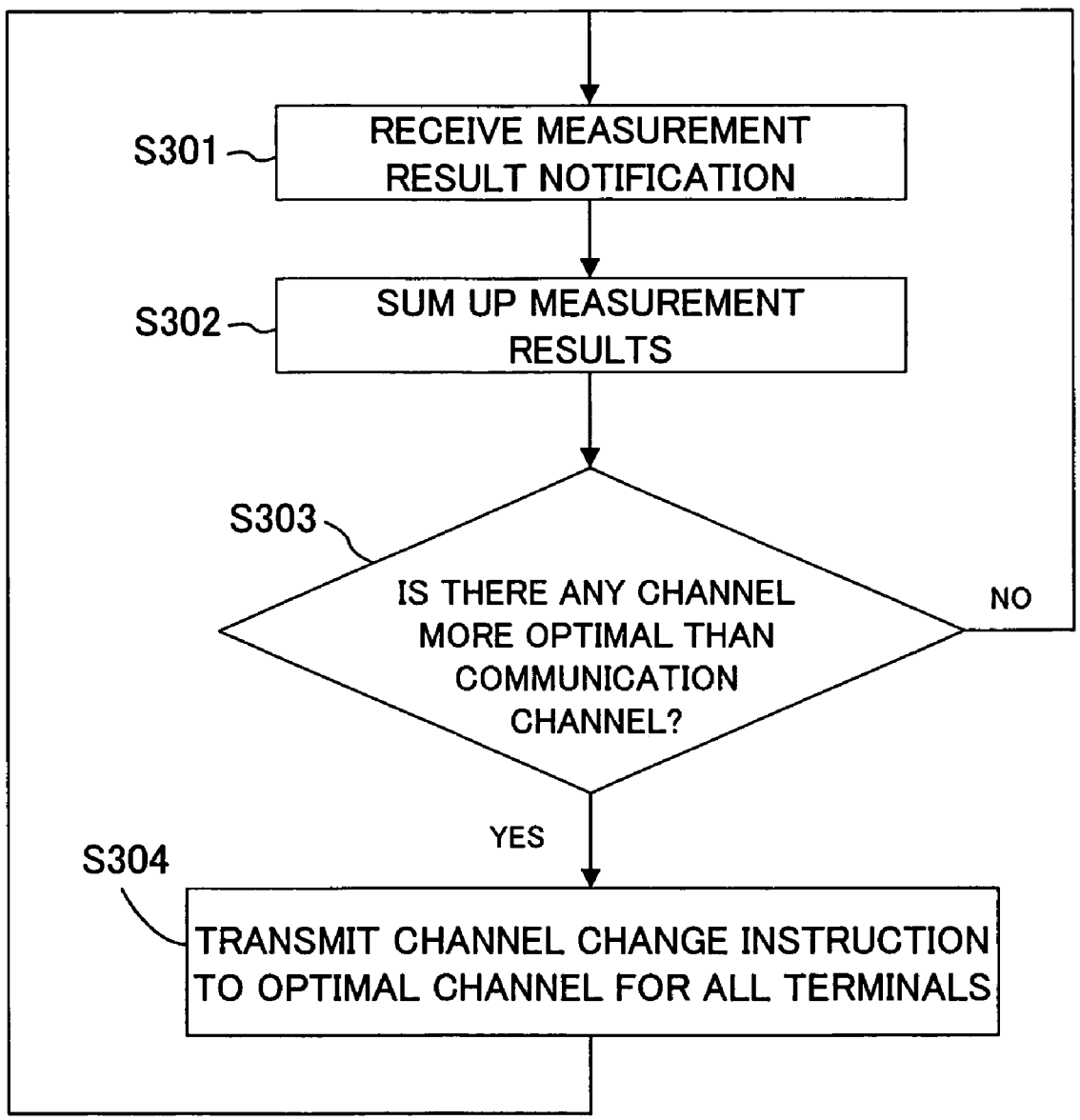
FIG. 3 is a flow chart for processing in a communication channel determining unit in the first embodiment.

A description will be given next to a flow according to the present embodiment. FIG. 3 shows the flow of the channel determining/changing process in the communication channel determining unit 202 according to the present embodiment. After the initiation of the process, first in Step S301, the communication channel determining unit 202 receives the measurement result notification 221 from each of the channel measuring unit 206 of the wireless terminal A to which it belongs and the channel measuring units 216 of the other wireless terminals B and C. Then, in Step S302, the communication channel determining unit 202 sums up the measurement results from the individual wireless terminals based on the received measurement results, as shown in FIG. 2. Subsequently, in Step S303, the communication channel determining unit 202 judges whether or not there is a more optimal communication channel for the entire wireless network to which the current communication channel can be changed based on the result of the summing up. When it is judged that there is no more optimal communication channel, the whole process flow returns to Step S301 where new measurement results are received. When it is judged that there is any more optimal communication channel, the whole process flow advances to Step S304 where the communication channel determining unit 202 transmits the channel change instruction 222 to each of the channel changing unit 203 of the wireless terminal to which it belongs and the channel changing units 213 of the other wireless terminals B and C. Through the sequence of process steps S301 to S304, the channel change to the more optimal communication channel for the entire wireless network is completed. Thereafter, the whole process flow returns to Step S301 and repeats the search of a more optimal communication channel.

Since the present embodiment thus determines the most optimal communication channel after summing up the measurement results from the individual wireless terminals in the wireless network, a useless channel change does not occur and the most optimal communication channel for the entire wireless network can be determined.

EMBODIMENT 2

Referring to FIGS. 5A and 5B, a description will be given next to a second embodiment of the present invention.

FIG. 5A is a weighting table for setting weights based on various factors at the individual wireless terminals including the wireless terminal (wireless channel control terminal) A. The weighting table is held in the memory region of the communication channel determining unit 202 of the wireless terminal A. As shown in the table of FIG. 5B, the weighting table is reflected on the result of summing up the measurement results from the individual wireless terminals including the wireless terminal A. For example, because the value of the weight set to the wireless terminal A is 3 in FIG. 5A, the measurement results from the wireless terminal A has a weight triple the weight of the measurement result notification 221 from the channel measuring unit 216 of each of the wireless terminals B and C to which the weight having the value of 1 has been set. Accordingly, in the table of FIG. 5(*b*) obtained as a result of summing up the measurement results, the channel ch2 evaluated as more optimal in the measurement results from the wireless terminal A has a summed value of 3 and is determined as the most optimal channel by the communication channel determining unit 202 over the summed value of 4 of the channel ch1 evaluated as more optimal in the measurement at each of the wireless terminals B and C.

In the case where the weight is assumedly set to zero, the communication channel determining unit 202 can also ignore the measurement results from the wireless terminal to which it belongs.

In the case where it is not necessary to individually set weights to the wireless terminals on a per wireless-terminal basis, weighting as shown in the first embodiment need not necessarily be performed. All the wireless terminals may also be treated equally.

Although the present embodiment has described the case where the two other wireless terminals B and C are provided besides the wireless channel control terminal A, at least one wireless terminal is sufficient to implement the other wireless terminal.

EMBODIMENT 3

Referring to FIGS. 6A and 6B, a description will be given next to a third embodiment of the present invention.

FIG. 6A shows a weighting table based on the presence or absence of a bandwidth guarantee. As a weighting factor, the presence or absence of a bandwidth guarantee (specified weight) given to data communication at each of the wireless terminals A, B, and C is used in the present embodiment. Data communication to which a bandwidth guarantee is given is normally important data communication such as, e.g., image data currently being delivered which has a high need to be protected from wave interference. Accordingly, important data communication in the wireless network can be protected by setting a large weight to each of the measurement results from the wireless terminal performing data communication with a bandwidth guarantee.

FIG. 6B shows the summing up of the measurement results on which the result of weighting based on the presence or absence of a bandwidth guarantee has been reflected. In the present embodiment, the weight of each of the measurement results from the wireless terminal B with a bandwidth guarantee is set larger than the weight set to each of the wireless terminals A and C without a bandwidth guarantee. Therefore, the channel ch4 evaluated as more optimal in the measurement results from the wireless terminal B is determined as the most optimal channel by the communication channel determining unit 202.

Although the weighting is performed based only on the presence or absence of a bandwidth guarantee in the summing up of the measurement results of FIG. 6B, it will easily be understood that, even when a bandwidth guarantee is present, the weighting can be adjusted in accordance with the content of the bandwidth guarantee such as a bandwidth to be guaranteed or a priority.

EMBODIMENT 4

Figure 8:
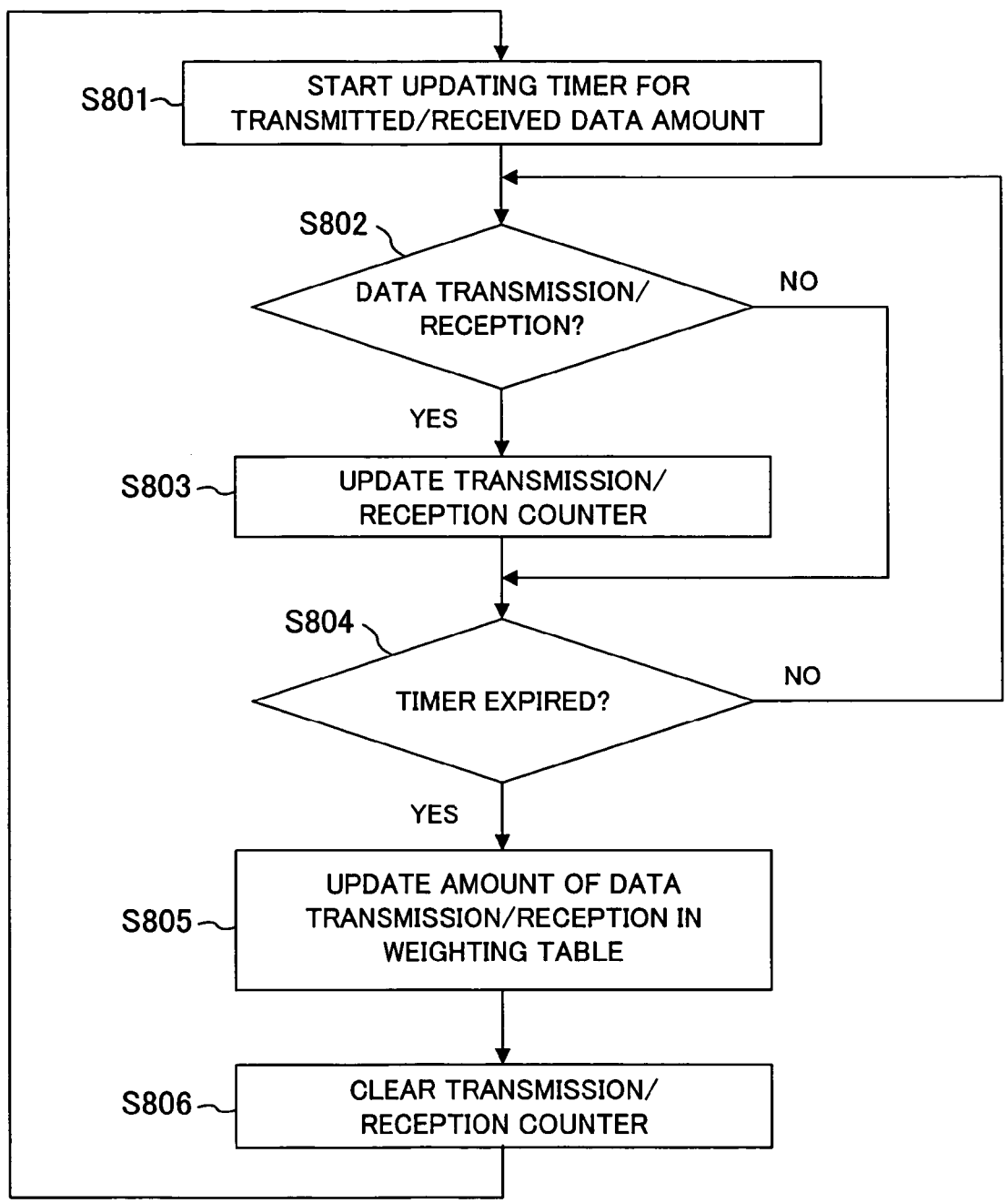
FIG. 8 is a flow chart for an updating process for transmitted/received data amount in the fourth embodiment.

Referring to FIGS. 7A and 7B and FIG. 8, a description will be given next to a fourth embodiment of the present invention.

FIG. 7A shows a weighting table based on an amount of data transmission/reception. As a weighting factor, an amount of data transmission/reception (specified weight) in data communication at each of the wireless terminals A, B, and C is used in the present embodiment. As the amount of data transmission/reception is larger at any of the wireless terminals, the wireless terminal is more positively using the communication channel so that the wireless terminal has a high need to be protected from wave interference. Accordingly, a larger amount of data communication can be protected by setting a large weight to each of the measurement results from the wireless terminal with a large amount of data transmission/reception in data communication.

FIG. 7B shows the summing up of the measurement results on which the result of weighting based on the amount of data transmission/reception has been reflected. In the present embodiment, the weight of each of the measurement results from the wireless terminal B with the largest amount of data transmission/reception has been set larger than the weight set to each of the wireless terminals A and C each with no amount of data transmission/reception. Therefore, the channel ch3 evaluated as more optimal in the measurement results from the wireless terminal B is determined as the most optimal channel by the communication channel determining unit 202.

Since an amount of data transmission/reception at each of the wireless terminals A, B, and C constantly changes, it is necessary for the wireless terminal A as the wireless channel control terminal to monitor the amount of data transmission/reception at each of the wireless terminals A, B, and C including itself and constantly set the latest amounts of data transmission/reception to the weighting table.

In a flow chart for an updating process for transmitted/received data amount shown in FIG. 8, the amount of data transmission/reception at each of the wireless terminals A, B, and C is calculated by using an updating timer for transmitted/received data amount and individual data transmission/reception counters for the respective wireless terminals A, B, and C. First, in Step S801, the updating timer for transmitted/received data amount is started. Subsequently, it is judged in Step S802 whether or not any data transmission/reception has occurred. When no data transmission/reception has occurred, the whole process flow advances to Step S804 where it is judged whether or not the timer has expired. When any data transmission/reception has occurred in Step S802, the whole process flow advances to Step S803 where the data transmission/reception counters are updated. Next, it is judged in Step S804 whether or not the timer has expired. When no time expiration has occurred, the whole process flow returns to Step S802 described above and the process from the judgment of whether or not any data transmission/reception has occurred is performed. When the timer has expired, the whole process flow advances to Step S805 where the amounts of data transmission/reception in the weighting table of FIG. 7A are updated. Thus, the summing-up table of the measurement results of FIG. 7B on which the latest weighting data has been reflected is obtained. Then, in Step S806, the data transmission/reception counters are cleared and the whole process flow is returned to Step S801 for the next updating.

Although the present embodiment has described the case where the two other wireless terminals are provided besides the wireless channel control terminal, at least one wireless terminal is sufficient to implement the other wireless terminal.

EMBODIMENT 5

Figure 10:
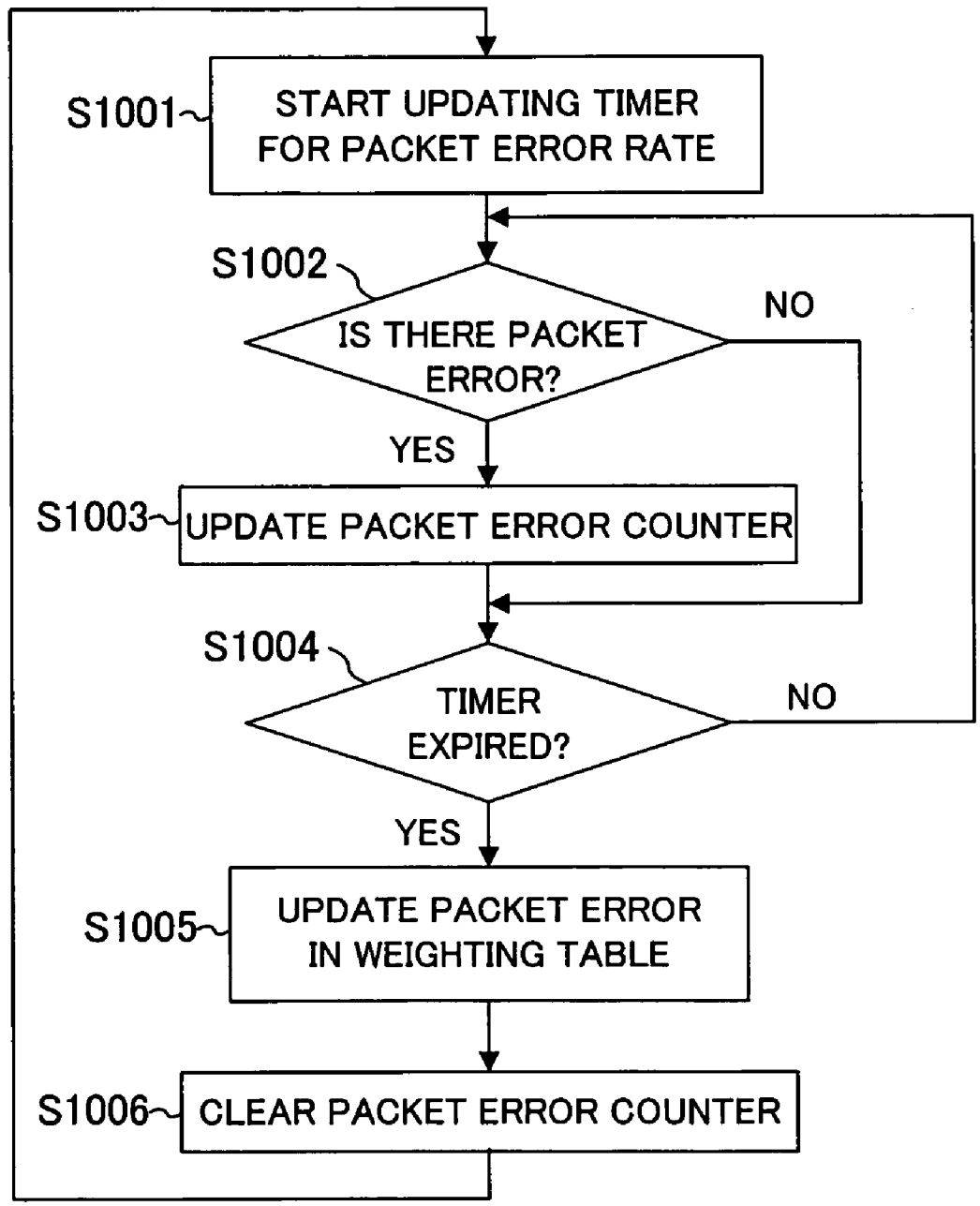
FIG. 10 is a flow chart for an updating process for packet error rate in the fifth embodiment.

Referring to FIGS. 9A and 9B and FIG. 10, a description will be given next to a fifth embodiment of the present invention.

FIG. 9A shows a weighting table based on a packet error rate (PER). As a weighting factor, a packet error rate (specified weight) in data communication at each of the wireless terminals is used in the present embodiment. When the packet error rate is high at any of the wireless terminals, the data communication at the wireless terminal may conceivably be disturbed by wave interference so that the wireless terminal has a high need to be protected from the wave interference. Accordingly, data communication the quality of which has been degraded by the wave interference can be protected by setting a large weight to each of the measurement results from the wireless terminal with a high packet error rate.

FIG. 9B shows the summing up of the measurement results on which the result of weighting based on the packet error rate has been reflected. In the present embodiment, the weight of each of the measurement results from the wireless terminal C with the highest packet error rate has been set larger than the weight set to each of the wireless terminals A and B each with a packet error rate of 0%. Accordingly, the channel ch1 evaluated as more optimal in the measurement results from the wireless terminal C is determined as the most optimal channel by the communication channel determining unit 202.

Since the packet error rate at each of the wireless terminals A, B, and C also constantly changes similarly to the amount of data transmission/reception shown in the fourth embodiment, it is necessary for the wireless channel control terminal A to monitor the packet error rate at each of the wireless terminals A, B, and C including itself and constantly set the latest packet error rates to the weighting table.

In a flow chart for an updating process for packet error rate shown in FIG. 10, the packet error at each of the wireless terminals is calculated by using an updating timer for packet error rate and individual packet error counters for the respective wireless terminals.

First, in Step S1001, the updating timer for packet error rate is started. Subsequently, it is judged in Step S1002 whether or not any packet error has occurred. When no packet error has occurred, the whole process flow advances to Step S1004 where it is judged whether or not the timer has expired. When any packet error has occurred, the packet error counters are updated next in Step S1003. Next, it is judged in Step S1004 whether or not the timer has expired. As a result of the timer expiration judgment, when it is judged that the timer has not expired, the whole process flow is returned to Step S1002 and the process from the judgment of whether or not any packet error has occurred is performed again. When it is judged that the timer has expired, the packet error rates in the weighting table of FIG. 9A are updated next in Step S1005. Thus, the summing-up table of the measurement results of FIG. 9B on which the latest weighting data has been reflected is obtained. Then, the packet error counters are cleared in Step S1006 and the whole process flow is returned to Step S1001 for the next updating.

Although the present embodiment has described the case where the two other wireless terminals are provided besides the wireless channel control terminal, at least one wireless terminal is sufficient to implement the other wireless terminal.

EMBODIMENT 6

Referring to FIGS. 11A and 11B, a description will be given next to a sixth embodiment of the present invention.

FIG. 11A shows a weighting table based on whether or not each of the wireless terminals is the wireless channel control terminal. As a weighting factor, the criterion of whether or not each of the wireless terminals is the wireless channel control terminal (specified weight) is used in the present embodiment. In most cases, the wireless channel control terminal is placed as a base station at the center of the wireless network. The wireless channel control terminal is normally the most important one of all the wireless terminals and has a high need to be protected from wave interference. Accordingly, the data communication at the wireless terminal as the center of the wireless network can be protected by setting a large weight to each of the measurement results from the wireless terminal serving as the wireless channel control terminal.

FIG. 11B shows the summing up of the measurement results on which the result of weighting based on whether or not each of the wireless terminals is the wireless channel control terminal has been reflected. In the present embodiment, the weight of each of the measurement results from the wireless terminal serving as the wireless channel control terminal has been set larger than the weight set to each of the wireless terminals B and C. Therefore, the channel ch2 evaluated as more optimal in the measurement results from the wireless terminal A is determined as the most optimal channel by the communication channel determining unit 202.

Although the present embodiment has described the case where the two other wireless terminals are provided besides the wireless channel control terminal, at least one wireless terminal is sufficient to implement the other wireless terminal.

EMBODIMENT 7

Referring to FIGS. 12A and 12B, a description will be given next to a seventh embodiment of the present invention.

FIG. 12A shows a weighting table based on user specification. In the present embodiment, weights are manually set by the user. In a normal situation, the user recognizes the purpose for which each of the wireless terminals is used. Accordingly, the user is allowed to protect the wireless terminal important to himself or herself by pre-setting the specified weights of the individual wireless terminals to the wireless channel control terminal. As examples of the wireless terminal important to the user, there can be listed a wireless liquid-crystal TV set which requires real-time communication, a DVD/HD recorder which performs recording by wireless communication, and the like.

FIG. 12B shows the summing up of the measurement results on which the result of the weighting process performed by the user shown in FIG. 12A has been reflected. Since the user has set the largest weight to each of the measurement results from the wireless terminal A, the channel ch2 evaluated as more optimal in the measurement results from the wireless terminal A is determined as the most optimal channel by the communication channel determining unit 202.

Although the present embodiment has described the case where the two other wireless terminals are provided besides the wireless channel control terminal, at least one wireless terminal is sufficient to implement the other wireless terminal.

EMBODIMENT 8

Referring to FIGS. 13A and 13B, a description will be given next to an eighth embodiment of the present invention.

FIG. 13A shows a weighting table based on the reception intensity of a measurement result notification frame. As a weighting factor, the reception intensity (specified weight) of each of the measurement result notification frames transmitted from the channel measuring units 213 of the wireless terminals B and C and received by the receiving unit 204 of the wireless channel control terminal A is used in the present embodiment. When the reception intensity of the measurement result notification frame is low at any of the wireless terminals, the wireless terminal may assumedly be placed at a position distant from the wireless channel control terminal A so that the wireless terminal is susceptible to wave interference from another wireless network and has a high need to be protected from the wave interference. Accordingly, the data communication susceptible to the wave interference can be protected by setting a large weight to each of the measurement results from the wireless terminal at which the reception intensity of the measurement result notification frame is low.

FIG. 13B shows the summing up of the measurement results on which the result of weighting based on the reception intensity of the measurement result notification frame has been reflected. In the present embodiment, the largest weight has been set to each of the measurement results from the wireless terminal C at which the reception intensity of the measurement result notification frame is low. Therefore, the channel ch3 evaluated as more optimal in the measurement results from the wireless terminal C is determined as the most optimal channel by the communication channel determining unit.

Although a larger weight has been set to the wireless terminal at which the reception intensity of the measurement result notification frame is lower in the example of FIGS. 13A and 13B, it is also possible to ignore the measurement results from the wireless terminal placed at a position distant from the wireless channel control terminal by conversely setting a smaller weight thereto.

Although the present embodiment has described the case where the two other wireless terminals are provided besides the wireless channel control terminal, at least one wireless terminal is sufficient to implement the other wireless terminal.

EMBODIMENT 9

Referring to FIG. 14 and FIGS. 15A and 15B, a description will be given next to a ninth embodiment of the present invention.

FIG. 15A shows a weighting table based on the reliability of each of the measurement results. As a weighting factor, the reliability (specified weight) of each of the measurement results is used in the present embodiment. The reliability of the measurement result indicates the state where the content of the measurement result does not frequently change.

FIG. 14 is a table showing the presence or absence of a change in the order of the measurement results when the measurement of each of the channels ch1 to ch4 has repeatedly been performed a plurality of times. In FIG. 14, the orders of the channels ch3 and ch4 have been switched in the second-time measurement and the orders of the channels ch1 and ch4 have been switched in the fourth-time measurement. By thus recording the history of the measurement results from each of the wireless terminals in the communication channel determining unit 202 of the wireless channel control terminal A and determining a change rate in the order of the measurement results when the order of a more optimal channel is different from one measurement result to another, the reliability of the measurement can be calculated. When the measurement results from any of the wireless terminals frequently change in order, each of the measurement results from the wireless terminal is low in reliability so that it is necessary to set a smaller weight to the wireless terminal. The setting allows the determination of the communication channel using the measurement results with higher reliabilities.

FIG. 15B shows the summing up of the measurement results on which the result of weighting based on the reliability of the measurement result has been reflected. In the present embodiment, the weights of the measurement results from the wireless terminals B and C each of which transmits the measurement results with higher reliabilities have been set larger than the weight set to the wireless terminal A which transmits the measurement results with low reliabilities. Therefore, the channel ch1 evaluated as more optimal in the measurement results from each of the wireless terminals B and C is determined as the most optimal channel by the communication channel determining unit.

Although the present embodiment has described the case where the two other wireless terminals are provided besides the wireless channel control terminal, at least one wireless terminal is sufficient to implement the other wireless terminal.

EMBODIMENT 10

Referring to FIGS. 16A and 16B, a description will be given next to a tenth embodiment of the present invention.

FIG. 16A shows a weighting table based on a plurality of factors. As a weighting factor, the present embodiment uses a plurality of factors, which are some of the factors described above, in combination. In FIG. 16A, the combination (specified weight) of the presence or absence of a bandwidth guarantee and the amount of data transmission/reception has been used by way of example for weighting. Compared with weighting based on a single factor, a high need to be protected from wave interference can be more distinctly presented.

FIG. 16B shows the summing up of the measurement results on which the result of weighting based on a plurality of factors has been reflected. In the present embodiment, the weight of each of the measurement results from the wireless terminal B performing data communication with a bandwidth guarantee has been set larger than the respective weights set to the wireless terminal A which has a bandwidth guarantee but has no amount of data transmission/reception and to the wireless terminal C which has neither of a bandwidth guarantee and any amount of data transmission/reception. Therefore, the channel ch2 evaluated as more optimal in the measurement results from the wireless terminal B is determined as the most optimal channel by the communication channel determining unit 202.

Although the values shown for the individual weighting factors have been simply added up in the example of weighting of FIG. 16A, it will easily be understood that another method can also be used to calculate the weights.

Although the present embodiment has described the case where the two other wireless terminals are provided besides the wireless channel control terminal, at least one wireless terminal is sufficient to implement the other wireless terminal.

EMBODIMENT 11

Figure 17:
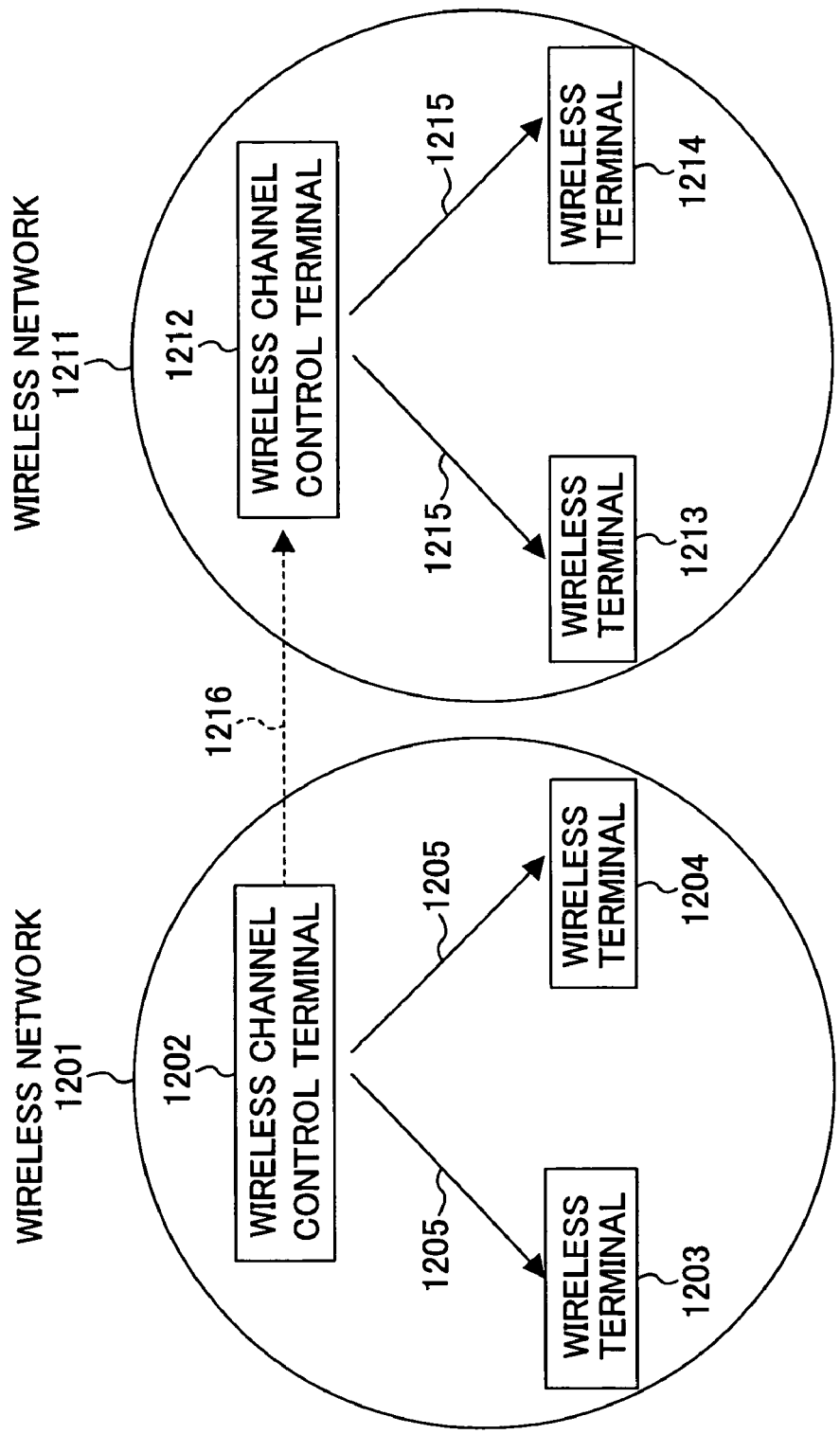
FIG. 17 is a structural view illustrating an example of intercepting a channel change instruction in a plurality of wireless networks in an eleventh embodiment of the present invention.

Referring to FIG. 17, a description will be given next to an eleventh embodiment of the present invention.

FIG. 17 shows the case where two wireless networks 1201 and 1211 perform channel measurement and a channel change instruction 1215 from one wireless channel control terminal 1202 is intercepted by the other wireless channel control terminal 1212. In the drawing, 1216 denotes an interception signal. The wireless channel management terminal 1212, which has intercepted the channel change instruction, can predict that each of the wireless channel control terminal 1202 of the wireless network 1201 and wireless terminals 1203 and 1204 each performing communication with the wireless channel control terminal 1202 will change the communication channel to the channel indicated by the channel change instruction 1205. Accordingly, even when the same channel as the communication channel indicated by the channel change instruction 1205 in the wireless network 1201 has assumedly been determined as the most optimal channel by the communication channel determining unit 202 of the wireless channel control terminal 1212 in the wireless network 1211, the wireless channel control terminal 1212 does not issue the same channel change instruction 1205 as issued in the adjacent wireless network 1201 but issues a different channel change instruction 1215 to each of the wireless terminals 1213 and 1214.

Although the present embodiment has described the case where the two other wireless terminals are provided besides the wireless channel control terminal, at least one wireless terminal is sufficient to implement the other wireless terminal.

EMBODIMENT 12

Figures 18, 19:
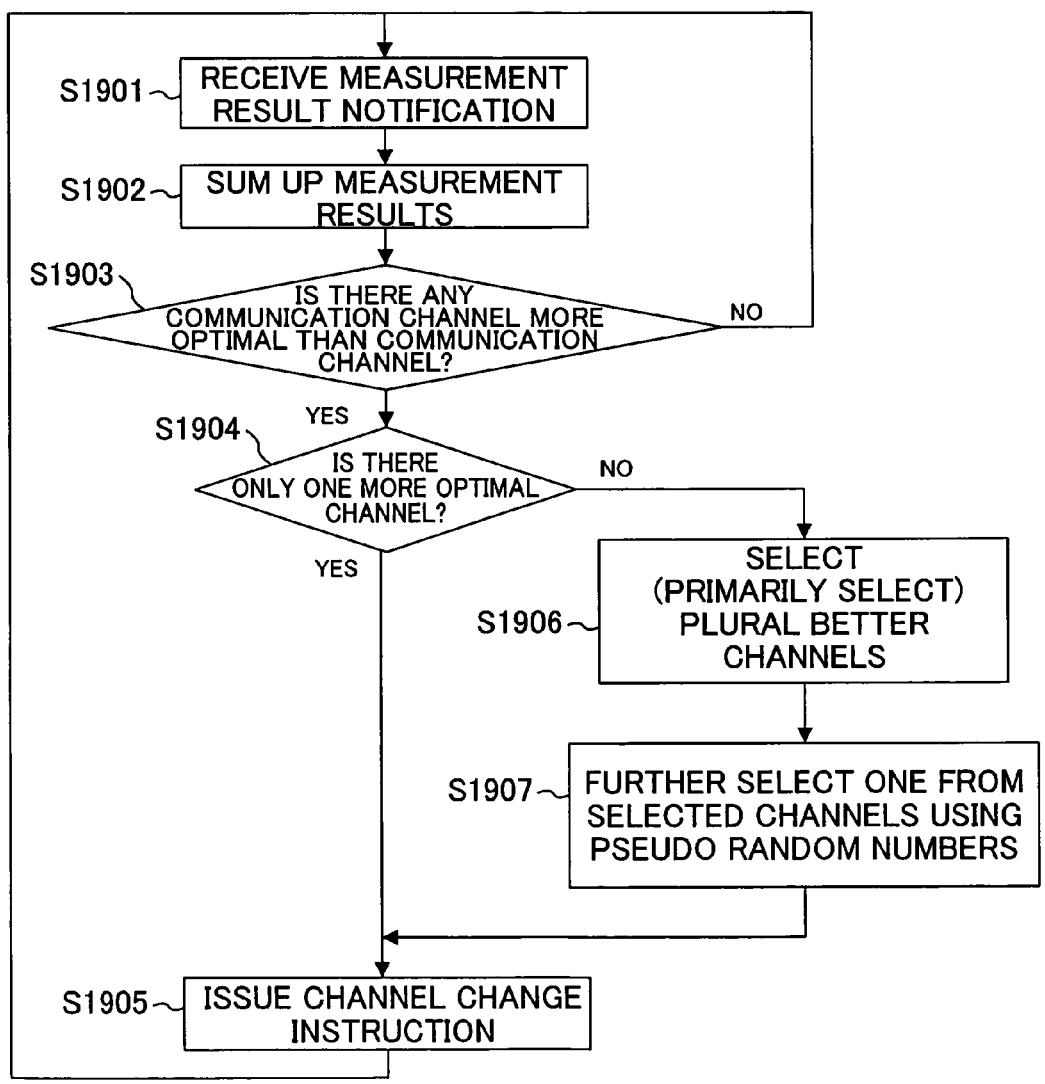
FIG. 18 is a view showing an example of the measurement results when there are a plurality of more optimal channels in a twelfth embodiment of the present invention.
FIG. 19 is a flow chart for selecting a communication channel when there are a plurality of more optimal channels in the twelfth embodiment.

Referring to FIGS. 18 and 19, a description will be given next to a twelfth embodiment of the present invention.

FIG. 18 shows the case where there are a plurality of more optimal channels as a result of summing up the measurement results, e.g., where the summed value of each of the channels ch2 to ch4 is zero. When there are a plurality of channels more optimal than the currently used communication channel as a result of summing up the measurement result notifications 221 from the individual channel measuring units 206 and 216, the communication channel determining unit 202 should primarily select these plurality of more optimal channels and then select one of them by using pseudo random numbers, thereby narrowing down the plurality of more optimal channels to only one. FIG. 19 is a flow chart for a process of selecting one of the plurality of more optimal channels performed by the communication channel determining unit 202.

In FIG. 19, first in Step S1901, the measurement result notifications 221 are received from the individual wireless terminals. Then, in Step S1902, the received measurement result notifications 221 are summed up. Subsequently, it is judged in Step S1903 whether or not there is any communication channel more optimal than the communication channel currently used for communication. When there is no more optimal communication channel, the process from Step S1901 is repeated. When there is any more optimal communication channel, the whole process flow advances to Step S1904 where the number of the more optimal communication channels is determined. When the number of the more optimal communication channels is one, the whole process flow advances to Step S1905 where the channel change instruction 222 for changing the current communication channel to the more optimal communication channel is issued from the communication channel determining unit 202 to each of the channel changing units 203 and 213 of the wireless terminals. However, when there are a plurality of more optimal channels which meet a specified standard, the whole process flow advances to Step S1906 where all the plurality of communication channels estimated as more optimal are primarily selected. Subsequently, in Step S1907, one communication channel is selected by using pseudo random numbers from the plurality of more optimal channels that have been primarily selected. Then, the whole process flow moves to Step S1905 where the channel change instruction 222 is issued from the communication channel determining unit 202 to each of the channel changing units 203 and 213 in the same manner as when there is only one more optimal communication channel in Step S1904. Thereafter, the process from Step S1901 is repeated so that the current communication channel is changed to the latest most optimal communication channel.

Although the present embodiment has described the case where the two other wireless terminals are provided besides the wireless channel control terminal, at least one wireless terminal is sufficient to implement the other wireless terminal.

EMBODIMENT 13

Figure 20:
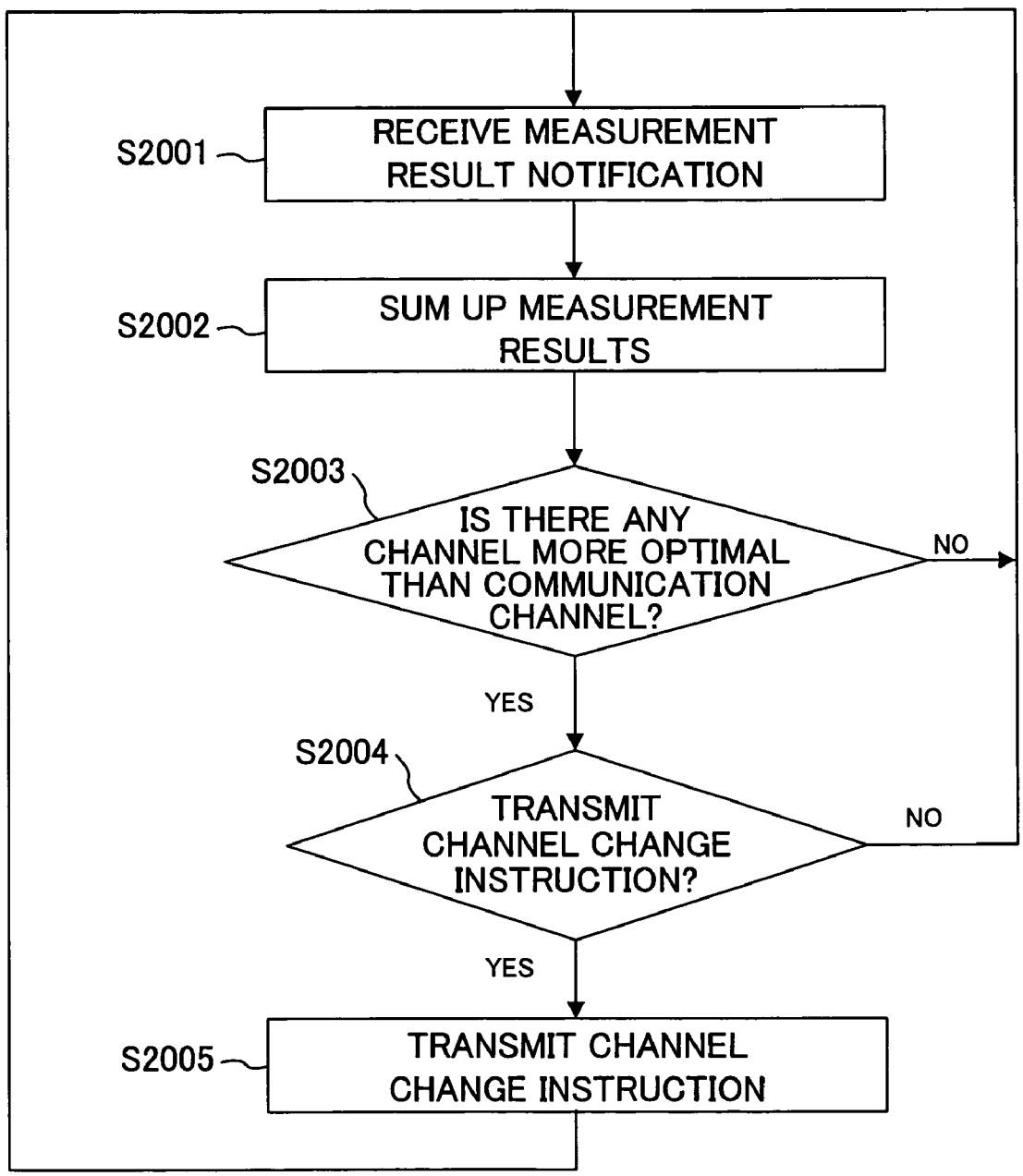
FIG. 20 is a flow chart for determining whether or not a channel change instruction is to be issued based on pseudo-random numbers in a thirteenth embodiment of the present invention.

Referring to FIG. 20, a description will be given next to a thirteenth embodiment of the present invention.

FIG. 20 shows a flow chart for a process of determining, when a channel more optimal than the current communication channel is determined, whether or not the channel change instruction 222 is to be transmitted by using pseudo random numbers.

First, in Step S2001, the communication channel determining unit 202 receives the measurement result notifications 221. Next, in Step S2002, the communication channel determining unit 202 performs summing up based on the received measurement result notifications 221. Then, in Step S2003, the communication channel determining unit 202 judges whether or not there is any communication channel more optimal than the current communication channel. When there is no more optimal communication channel, the whole process flow returns to Step S2001. When there is any more optimal communication channel, the whole process flow moves to Step S2004 where a process of judging whether or not the channel change instruction 222 is to be transmitted is performed. When the 10 channel change instruction is not to be transmitted, the whole process flow returns to Step S2001. When the channel change instruction is to be transmitted, the whole process flow advances to Step S2005 where the channel change instruction 222 is transmitted from the communication channel determining unit 202 to each of the channel changing units 203 and 213.

When there is any channel more optimal than the current communication channel, the communication channel determining unit 202 transmits the channel change instruction 222 to each of the wireless terminals A, B, and C in the same network, including the wireless terminal to which it belongs. When there are a plurality of wireless networks composed of the communication channel determining units 202 each having the same algorithm, there is a possibility that the same channel is selected simultaneously as the new communication channel and mutual wave interferences may occur after the channel change. Accordingly, such over-transmission of the channel change instruction 222 can be circumvented by allowing the communication channel determining unit 202 to determine whether or not the channel change instruction 222 is to be transmitted by using pseudo random numbers. Thus, the processing of the channel change instruction 222 is performed. Thereafter, the process from Step S2001 is repeated.

Although the present embodiment has described the case where the two other wireless terminals are provided besides the wireless channel control terminal, at least one wireless terminal is sufficient to implement the other wireless terminal.

What is claimed is:

1. A wireless terminal using, as a communication channel for communication, either or any of two or more wireless channels to be used in a wireless network formed between the wireless terminal itself and at least one other wireless terminal, the wireless terminal comprising:
   a channel measuring unit having a function of measuring a state of use indicating whether or not a communication state of each of the two or more wireless channels is optimal and outputting a result of the measurement;
   a receiving unit for receiving the state of use of the wireless channel measured by the other wireless terminal with which the communication currently proceeds from the other wireless terminal;
   a communication channel determining unit for determining a new communication channel in an optimal communication state to be newly used for the communication in place of the currently used communication channel based on a result of summing up states of use obtained as the measurement results outputted from the channel measuring unit of the wireless terminal itself and states of use obtained as the measurement results outputted from the other wireless terminal and outputting a channel change instruction for changing the currently used communication channel to the new communication channel;
   a channel changing unit for changing the currently used communication channel to the new communication channel in response to the channel change instruction outputted from the communication channel determining unit that has determined the new communication channel; and
   a transmitting unit for transmitting the channel change instruction outputted from the communication channel determining unit to the other wireless terminal,
   wherein the communication channel determining unit sets a specified weight to each of individual values obtained as the measurement results and sums up the states of use to each of which the specified weight has been set, and
   the specified weight is defined for each of the wireless terminal itself and the other wireless terminal.

2. The wireless terminal of claim 1, wherein the communication channel determining unit sets the specified weight to each of the measured states of use based on the presence or absence of a bandwidth guarantee given to each of wireless terminals having and not having the communication channel determining unit and sums up the states of use to each of which the specified weight has been set.

3. The wireless terminal of claim 1, wherein the communication channel determining unit sets the specified weight to each of the measured states of use based on an amount of data transmission/reception of each of wireless terminals having and not having the communication channel determining unit and sums up the states of use to each of which the specified weight has been set.

4. The mobile wireless terminal of claim 1, wherein the communication channel determining unit sets the specified weight to each of the measured states of use based on an error rate in an amount of data transmission/reception of each of wireless terminals having and not having the communication channel determining unit and sums up the states of use to each of which the specified weight has been set.

5. The wireless terminal of claim 1, wherein the communication channel determining unit sets the specified weight to each of the measured states of use such that the weight of a wireless terminal having the communication channel determining unit is larger than the weight of a wireless terminal not having the communication channel determining unit and sums up the states of use to each of which the specified weight has been set.

6. The wireless terminal of claim 1, wherein the communication channel determining unit allows a user to arbitrarily set the specified weight to each of the measured states of use and sums up the states of use to which the specified weight has been set.

7. The wireless terminal of claim 1, wherein the communication channel determining unit sets the specified weight to each of the measured states of use based on a wave reception intensity of each of the measurement results transmitted from the other wireless terminal and sums up the states of use to each of which the specified weight has been set.

8. The wireless terminal of claim 1, wherein the communication channel determining unit sets the specified weight to each of the measured states of use based on a reliability of each of the measurement results previously obtained and sums up the states of use to each of which the specified weight has been set.

9. The wireless terminal of claim 1, wherein the communication channel determining unit determines the new communication channel by simultaneously using at least two different weights.

10. The wireless terminal of claim 1, wherein, when the communication channel determining unit has intercepted the channel change instruction transmitted from the other communication channel determining unit of the other wireless terminal in a wireless network other than the wireless network to which the wireless terminal belongs, the communication channel determining unit does not perform a channel change to a channel indicated by the intercepted channel change instruction.

11. The wireless terminal of claim 1, wherein the communication channel determining unit primarily selects a plurality of the communication channels in accordance with a specified standard based on each of the received measurement results and then selects the new communication channel from the primarily selected communication channels by using pseudo-random numbers.

12. The wireless terminal of claim 1, wherein the communication channel determining unit selectively determines whether or not the channel change to the new communication channel is to be performed based on pseudo-random numbers.

13. A wireless communication system comprising:
   one wireless terminal comprising a communication channel determining unit; and
   at least one other wireless terminal not comprising the communication channel determining unit, wherein
   the communication channel determining unit is configured to:
   determine a new communication channel in an optimal communication state to be newly used for communication in place of a currently used communication channel based on a result of summing up states of use obtained as measurement results outputted from a channel measuring unit of said one wireless terminal and states of use received from other wireless terminal;

output a channel change instruction for changing the currently used communication channel to the new communication channel; and set a specified weight to each of individual values obtained as the measurement results and sums up the states of use to each of which the specified weight has been set, the specified weight being defined for each of said one wireless terminal and said at least one other wireless terminal.

* * * * *